US007408324B2

(12) United States Patent
Baarman et al.

(10) Patent No.: US 7,408,324 B2
(45) Date of Patent: Aug. 5, 2008

(54) IMPLEMENT RACK AND SYSTEM FOR ENERGIZING IMPLEMENTS

(75) Inventors: David W. Baarman, Fennville, MI (US); Terry L. Lautzenheiser, Nunica, MI (US); Thomas Jay Leppien, Grand Haven, MI (US)

(73) Assignee: Access Business Group International LLC, Ada, MI (US)

( * ) Notice: Subject to any disclaimer, the term of this patent is extended or adjusted under 35 U.S.C. 154(b) by 391 days.

(21) Appl. No.: 10/975,096

(22) Filed: Oct. 27, 2004

(65) Prior Publication Data

US 2006/0087282 A1 Apr. 27, 2006

(51) Int. Cl.
 *H01M 10/46* (2006.01)
(52) U.S. Cl. ..................................................... 320/108
(58) Field of Classification Search ................. 320/108, 320/114, 115
 See application file for complete search history.

(56) References Cited

U.S. PATENT DOCUMENTS

| 602,966 | A | 4/1898 | Wallach |
|---|---|---|---|
| 843,534 | A | 2/1907 | Hewitt |
| 1,137,333 | A | 4/1915 | Klorer |
| 1,604,870 | A | 10/1926 | Asman |
| 1,803,571 | A | 5/1931 | Ulman |
| 1,852,740 | A | 4/1932 | Doane |
| 2,199,107 | A | 4/1940 | Kibbe |
| 2,265,475 | A | 12/1941 | Fodor |
| 2,353,063 | A | 7/1944 | Otis |
| 2,686,866 | A | 8/1954 | Williams |
| 2,726,116 | A | 12/1955 | Barber |
| 2,731,547 | A | 1/1956 | Callard |
| 3,047,765 | A | 7/1962 | Vichill |
| 3,292,579 | A | 12/1966 | Buchanan |
| 3,550,682 | A | 12/1970 | Fowler |
| 3,551,091 | A | 12/1970 | Veloz |
| 3,628,086 | A | 12/1971 | Nuckolls |
| 3,641,336 | A | 2/1972 | Boin |
| 3,743,989 | A | 7/1973 | Nicolas et al. |
| 3,746,906 | A | 7/1973 | Cardwell, Jr. |
| 3,867,661 | A | 2/1975 | Waltz et al. |

(Continued)

FOREIGN PATENT DOCUMENTS

AT 370929 5/1983

(Continued)

OTHER PUBLICATIONS

"A Contactless Electrical Energy Transmission System for Portable-Telephone Battery Chargers", IEEE Transactions on Industrial Electronics, vol. 50, No. 3, Jun. 2003.

(Continued)

*Primary Examiner*—Edward Tso
(74) *Attorney, Agent, or Firm*—Warner Norcross & Judd LLP

(57) ABSTRACT

An inductive charging rack for providing electrical power to an implement includes a back, an inductive primary attached to the back, and a hanger for holding the implement. The rack may include a control for energizing the inductive primary and a transceiver for providing communication to and from the implement. The inductive primary could be attached to the surface of the charging rack or it could be incorporated within the rack.

22 Claims, 7 Drawing Sheets

U.S. PATENT DOCUMENTS

| | | | |
|---|---|---|---|
| 3,885,185 A | 5/1975 | Tilley |
| 3,885,211 A | 5/1975 | Gutai |
| 3,923,663 A | 12/1975 | Reid |
| 3,938,018 A | 2/1976 | Dahl |
| 4,005,330 A | 1/1977 | Glascock, Jr. et al. |
| 4,010,400 A | 3/1977 | Hollister |
| 4,017,764 A | 4/1977 | Anderson |
| 4,038,625 A | 7/1977 | Tompkins et al. |
| 4,093,893 A | 6/1978 | Anderson |
| 4,101,777 A | 7/1978 | Reid |
| 4,117,378 A | 9/1978 | Glascock, Jr. |
| 4,282,563 A | 8/1981 | Ohta et al. |
| 4,300,073 A | 11/1981 | Skwirut et al. |
| 4,389,595 A | 6/1983 | Kamei et al. |
| 4,414,489 A | 11/1983 | Young |
| 4,584,707 A | 4/1986 | Goldberg et al. |
| 4,615,799 A | 10/1986 | Mortensen |
| 4,637,434 A | 1/1987 | Moen |
| 4,675,573 A | 6/1987 | Miram et al. |
| 4,675,638 A | 6/1987 | Szabo |
| 4,747,158 A | 5/1988 | Goldberg et al. |
| 4,752,401 A | 6/1988 | Bodenstein |
| 4,762,613 A | 8/1988 | Snowball |
| 4,772,991 A | 9/1988 | Wood |
| 4,800,328 A | 1/1989 | Bolger et al. |
| 4,812,702 A | 3/1989 | Anderson |
| 4,816,977 A | 3/1989 | Sorensen |
| 4,818,855 A | 4/1989 | Mongeon et al. |
| 4,838,797 A | 6/1989 | Dodier |
| 4,854,214 A | 8/1989 | Lowe |
| 4,857,204 A | 8/1989 | Joklik |
| 4,894,591 A | 1/1990 | Witting |
| 4,954,756 A | 9/1990 | Wood et al. |
| 4,958,266 A | 9/1990 | Sorensen et al. |
| 4,968,437 A | 11/1990 | Noll et al. |
| 4,971,687 A | 11/1990 | Anderson |
| 4,972,120 A | 11/1990 | Witting |
| 4,977,354 A | 12/1990 | Bergervoet et al. |
| 5,030,889 A | 7/1991 | El-Hamamsy et al. |
| 5,039,903 A | 8/1991 | Farrall |
| 5,041,763 A | 8/1991 | Sullivan et al. |
| 5,054,112 A | 10/1991 | Ike |
| 5,070,293 A | 12/1991 | Ishii et al. |
| 5,101,332 A | 3/1992 | Hsia |
| 5,122,729 A | 6/1992 | Itoga et al. |
| 5,141,325 A | 8/1992 | Huang |
| 5,146,140 A | 9/1992 | Piejak et al. |
| 5,158,361 A | 10/1992 | Huang |
| 5,184,891 A | 2/1993 | Shpigel |
| 5,216,402 A | 6/1993 | Carosa |
| 5,229,652 A | 7/1993 | Hough |
| 5,264,997 A | 11/1993 | Hutchisson et al. |
| 5,267,997 A | 12/1993 | Farin et al. |
| 5,280,416 A | 1/1994 | Hartley et al. |
| 5,289,085 A | 2/1994 | Godyak et al. |
| 5,300,860 A | 4/1994 | Godyak et al. |
| 5,301,096 A | 4/1994 | Klontz et al. |
| 5,311,028 A | 5/1994 | Glavish |
| 5,339,233 A | 8/1994 | Yang |
| 5,341,280 A | 8/1994 | Divan et al. |
| 5,416,388 A | 5/1995 | Shackle |
| 5,422,519 A | 6/1995 | Russell |
| 5,450,305 A | 9/1995 | Boys et al. |
| 5,455,466 A | 10/1995 | Parks et al. |
| 5,455,467 A | 10/1995 | Young et al. |
| 5,465,025 A | 11/1995 | Hendrickson |
| 5,506,560 A | 4/1996 | Takeuchi et al. |
| 5,536,979 A | 7/1996 | McEachern et al. |
| 5,550,452 A | 8/1996 | Shirai et al. |
| 5,553,312 A | 9/1996 | Gattey et al. |
| 5,594,304 A | 1/1997 | Graber |
| 5,600,225 A | 2/1997 | Goto |
| 5,611,918 A | 3/1997 | Markham |
| 5,619,182 A | 4/1997 | Robb |
| 5,653,531 A | 8/1997 | Yang |
| 5,675,677 A | 10/1997 | Davenport et al. |
| 5,680,028 A | 10/1997 | McEachern |
| 5,716,126 A | 2/1998 | Meyer |
| 5,747,894 A | 5/1998 | Hirai et al. |
| 5,771,438 A | 6/1998 | Palermo et al. |
| 5,814,900 A | 9/1998 | Esser et al. |
| 5,831,348 A | 11/1998 | Nishizawa |
| 5,831,516 A | 11/1998 | Jennings |
| 5,834,905 A | 11/1998 | Godyak et al. |
| 5,905,343 A | 5/1999 | McCamant |
| 5,923,544 A | 7/1999 | Urano |
| 5,928,505 A | 7/1999 | Inakagata et al. |
| 5,929,598 A | 7/1999 | Nakama et al. |
| 5,949,155 A | 9/1999 | Tamura et al. |
| 5,951,155 A | 9/1999 | Lanser |
| 5,952,814 A | 9/1999 | Van Lerberghe |
| 5,980,056 A | 11/1999 | West |
| 5,990,611 A | 11/1999 | Lee |
| 6,005,304 A | 12/1999 | Seelig |
| 6,020,682 A | 2/2000 | Holzer |
| 6,027,225 A | 2/2000 | Martin et al. |
| 6,028,413 A | 2/2000 | Brockmann |
| 6,075,433 A | 6/2000 | Ono et al. |
| 6,118,249 A | 9/2000 | Brockmann et al. |
| 6,160,371 A | 12/2000 | Tachikawa |
| 6,161,032 A | 12/2000 | Acker |
| 6,166,494 A | 12/2000 | Green |
| 6,188,179 B1 | 2/2001 | Boys et al. |
| 6,194,828 B1 | 2/2001 | Kohne et al. |
| 6,218,785 B1 | 4/2001 | Incerti |
| 6,241,359 B1 | 6/2001 | Lin |
| 6,252,380 B1 | 6/2001 | Koenck |
| 6,263,247 B1 | 7/2001 | Mueller et al. |
| 6,275,143 B1 | 8/2001 | Stobbe |
| 6,280,066 B1 | 8/2001 | Dolan |
| 6,291,936 B1 | 9/2001 | MacLennan et al. |
| 6,301,128 B1 | 10/2001 | Jang et al. |
| 6,307,316 B1 | 10/2001 | Holzer |
| 6,322,226 B1 | 11/2001 | Dickson |
| 6,326,739 B1 | 12/2001 | MacLennan et al. |
| 6,339,296 B1 | 1/2002 | Goral |
| 6,345,203 B1 | 2/2002 | Mueller et al. |
| 6,436,299 B1 | 8/2002 | Baarman et al. |
| 6,459,882 B1 | 10/2002 | Palermo et al. |
| 6,462,432 B1 | 10/2002 | Seelig et al. |
| 6,597,076 B2 | 7/2003 | Scheible et al. |
| 2002/0154518 A1* | 10/2002 | Elferich et al. ............. 363/15 |
| 2003/0003971 A1* | 1/2003 | Yamamoto ................ 455/573 |
| 2003/0006880 A1 | 1/2003 | Zimmer |
| 2003/0042797 A1* | 3/2003 | Yang ............................ 307/64 |
| 2003/0222769 A1 | 12/2003 | Mau |
| 2004/0145343 A1* | 7/2004 | Naskali et al. ............. 320/108 |

FOREIGN PATENT DOCUMENTS

| | | |
|---|---|---|
| AU | A-61741/86 | 2/1988 |
| DE | 2029468 | 12/1971 |
| DE | 4100272 | 7/1991 |
| DE | 9012505 | 8/1991 |
| DE | 4238388 | 5/1994 |
| DE | 4421253 | 3/1995 |
| DE | 4412957 | 10/1995 |
| DE | 19540854 | 5/1997 |
| EP | 0825577 | 2/1998 |
| EP | 1209791 A2 | 11/2001 |
| GB | 1349788 | 4/1974 |
| GB | 2388715 A | 11/2003 |
| GB | 2388716 A | 11/2003 |
| JP | 8-31585 | 2/1996 |

| WO | WO 97/17761 | 5/1997 |
| WO | WO 97/26704 | 7/1997 |
| WO | WO 97/26705 | 7/1997 |
| WO | WO 00/22892 | 4/2000 |
| WO | WO 00/32298 | 6/2000 |
| WO | WO 00/54387 | 9/2000 |
| WO | WO 01/26427 | 4/2001 |
| WO | WO 01/26431 | 4/2001 |
| WO | WO 01/80396 A1 | 10/2001 |
| WO | WO 03/096361 | 11/2003 |
| WO | WO 03/105311 | 12/2003 |

OTHER PUBLICATIONS

"Best of Show", Fortune, Feb. 17, 2003.
"Splashpower", www.splashpower.com, Feb. 11, 2003.
"Mobilewise", www.mobilewise.com, Feb. 11, 2003.
Gulko, Michael, et al, Inductor-Controlled Current-Sourcing Resonant Inverter and its Application as a High Pressure Discharge Lamp Driver, IEEE, pp. 434-440, May 1994.

* cited by examiner

IMPLEMENT RACK AND SYSTEM FOR ENERGIZING IMPLEMENTS

BACKGROUND OF THE INVENTION

A variety of rechargeable electronic implements now exist. For example, line trimmers, leaf blowers and hedge trimmers are now rechargeable devices. While the devices are very convenient, recharging the devices is difficult.

Each device may have a slightly different adapter and charger. Thus, to use several different devices requires the user to have a plethora of different chargers and adapters. Further, since the rechargeable electronic implements are often bulky, the placement of the chargers and adapters causes additional logistical problems.

A rack to enable easy recharging of electronic implements is therefore highly desirable.

DETAILED DESCRIPTION OF THE DRAWINGS

As used herein, the phrase "coupled with" is defined to mean directly connected to or indirectly connected through one or more intermediate components. Such intermediate components may include both hardware and software based components.

Figure 1:
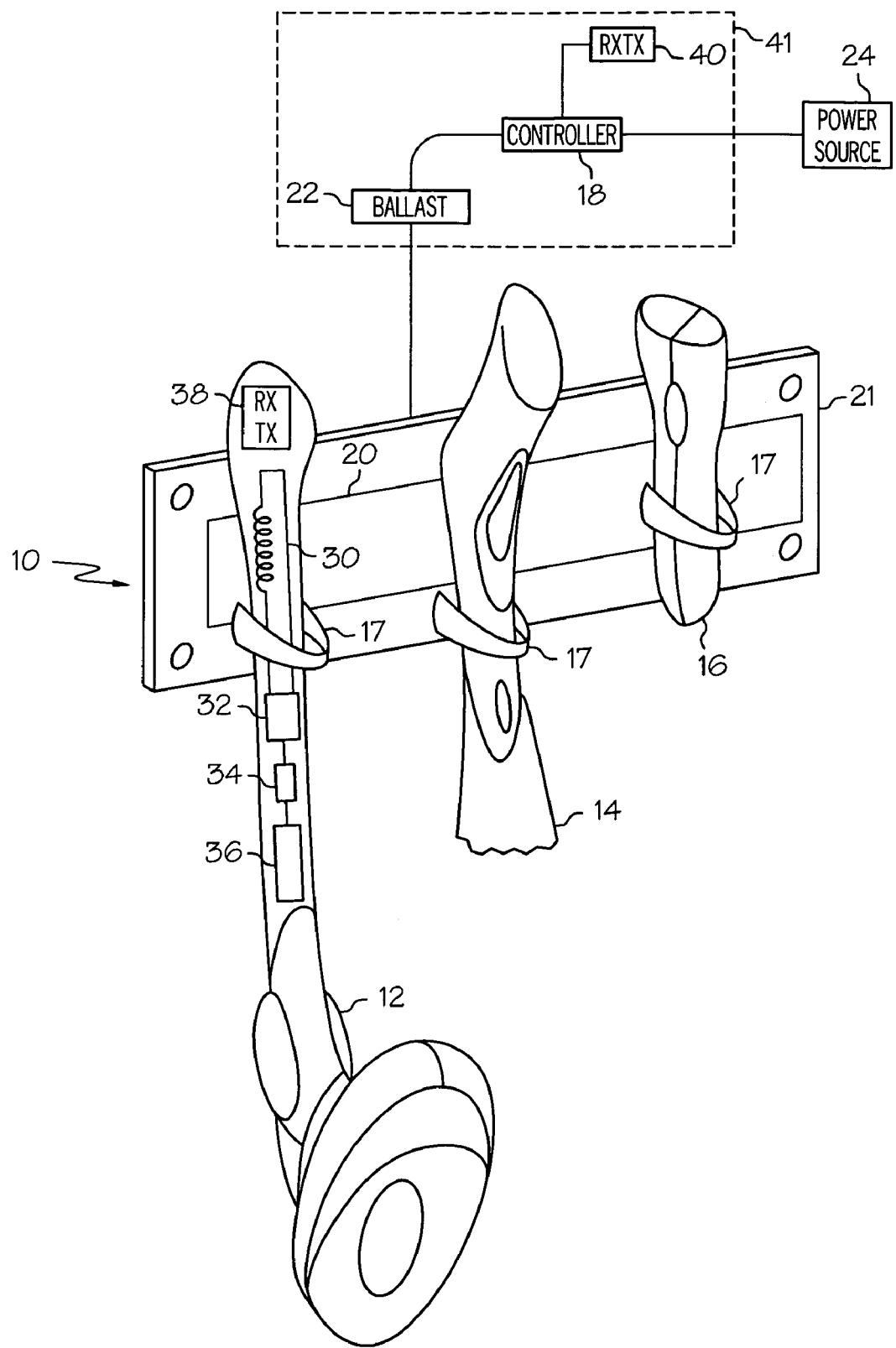
FIG. 1 shows tool recharging rack.

FIG. 1 shows tool recharging rack 10. Electronic implements 12, 14, and 16 are arranged within holders 17 of recharging rack 10.

Recharging rack 10 includes controller 18. Controller 18 regulates the supply of power to inductive primary 20 by ballast 22. Ballast 22 could be an adaptive ballast such as the one described in U.S. patent application Ser. Nos. 10/689,499 and 10/175,095, assigned to the assignee of this application. U.S. patent application Ser. Nos. 10/689,499 and 10/175,095 are hereby incorporated by reference.

Ballast 22 is connected to power source 24. Power source 24 could be a conventional AC (alternating current) outlet, a DC (direct current) power source, on any other source of power sufficient to energize ballast 22.

In FIG. 1, inductive primary 20 is contained entirely within back 21 of recharging rack 10. The inductive primary 20 is a coreless inductive primary. Electronic implements 12, 14, 16 are provided with an inductive secondary. Electronic implement 12 is shown as a rechargeable law trimmer. However, electronic implement 12 could be any powered device, such as a cordless electric screwdriver, a cordless saw, a cordless radio, a cordless media player, a cordless toothbrush, or a cordless mixer. Alternatively, recharging rack 10 could be equipped with multiple primaries 20, each providing power to a single electronic implement.

Electronic implement 12 includes inductive secondary 30, implement controller 32, recharger 34, and rechargeable power source 36. The interaction of the various components within electronic implement 12 is described in U.S. patent application Ser. No. 10/689,148, assigned to the assignee of this application, which is hereby incorporated by reference.

Briefly, the operation of the circuitry within electronic implement 12 is as follows. Inductive secondary 30 is energized by inductive primary 20. Implement controller 32 manages the application of power to recharger 34 and rechargeable power source 36. If provided, implement RXTX (transceiver) 38 communicates with charging rack RXTX 40 in order to more efficiently manage the application of power to rechargeable power source 36.

Controller 18, ballast 22 and RXTX 40 could be contained within control 41. Control 41 could be external to rack 10 or it could be integral with rack 10.

Figure 2:
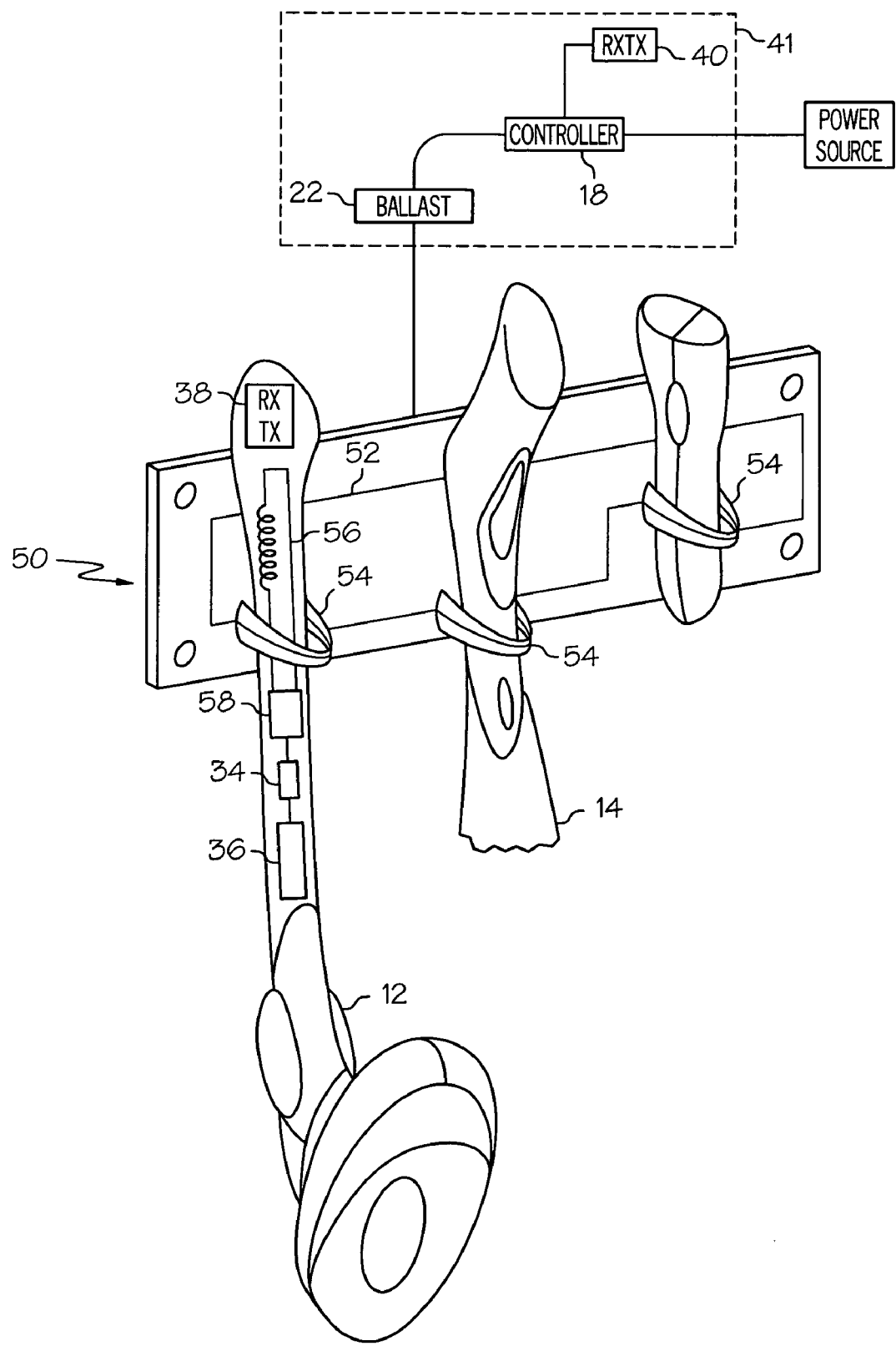
FIG. 2 shows an additional embodiment of an inductive charging rack.

FIG. 2 shows an additional embodiment of an inductive charging rack. As shown, inductive power rack 50 has inductive primary 52. Inductive primary 52 is arranged to pass through holds 54. Holds 54 are pivotal, allowing a portion of electronic implement 12 to be fitted under hold 54. The portion of electronic implement 12 fitting under hold 54 includes inductive secondary 56 of electronic implement 12. Thus, the inductive secondary of electronic implement 12 is positioned within the interior of inductive primary 52.

Figure 3:
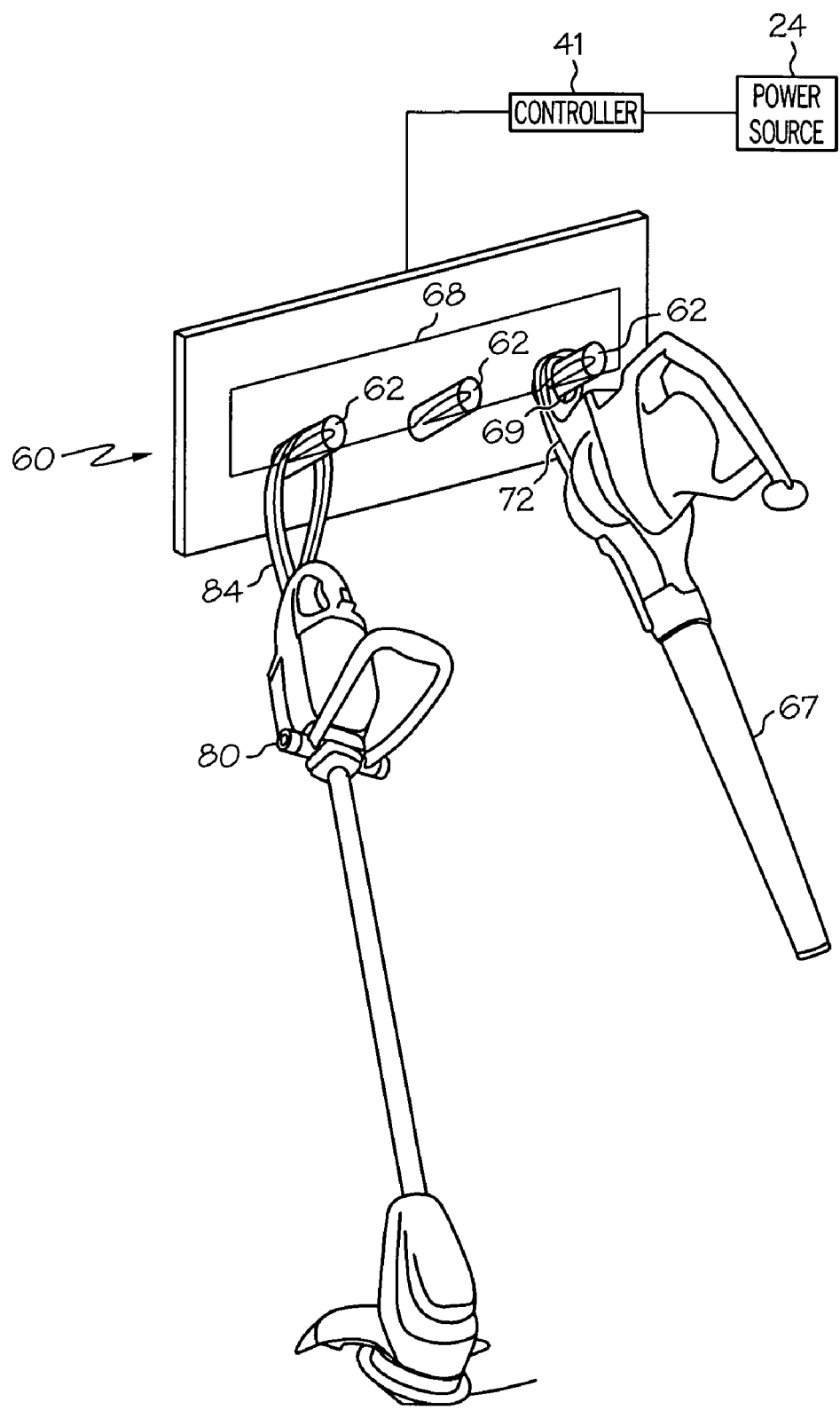
FIG. 3 shows a further embodiment of an inductive charging rack.

FIG. 3 shows a further embodiment of an inductive charging rack. In this configuration, charging rack 60 is provided with rods 62 extending in a plane generally perpendicular to that of charging rack 60. Inductive primary 68 extends into rods 62. Electronic implement 68 is provided with indentation 69 within outer-body 70 so that electronic implement 68 is held on rod 62. Inductive secondary 72 of electronic implement 68 is positioned proximal to indentation 69 so that inductive primary 68 extends into inductive secondary 72.

Electronic implement 80 is provided with flexible stay 82. Flexible stay 82 includes inductive secondary 84. Flexible stay 82 is arranged so that it is capable of placement around rod 62.

Figure 4:
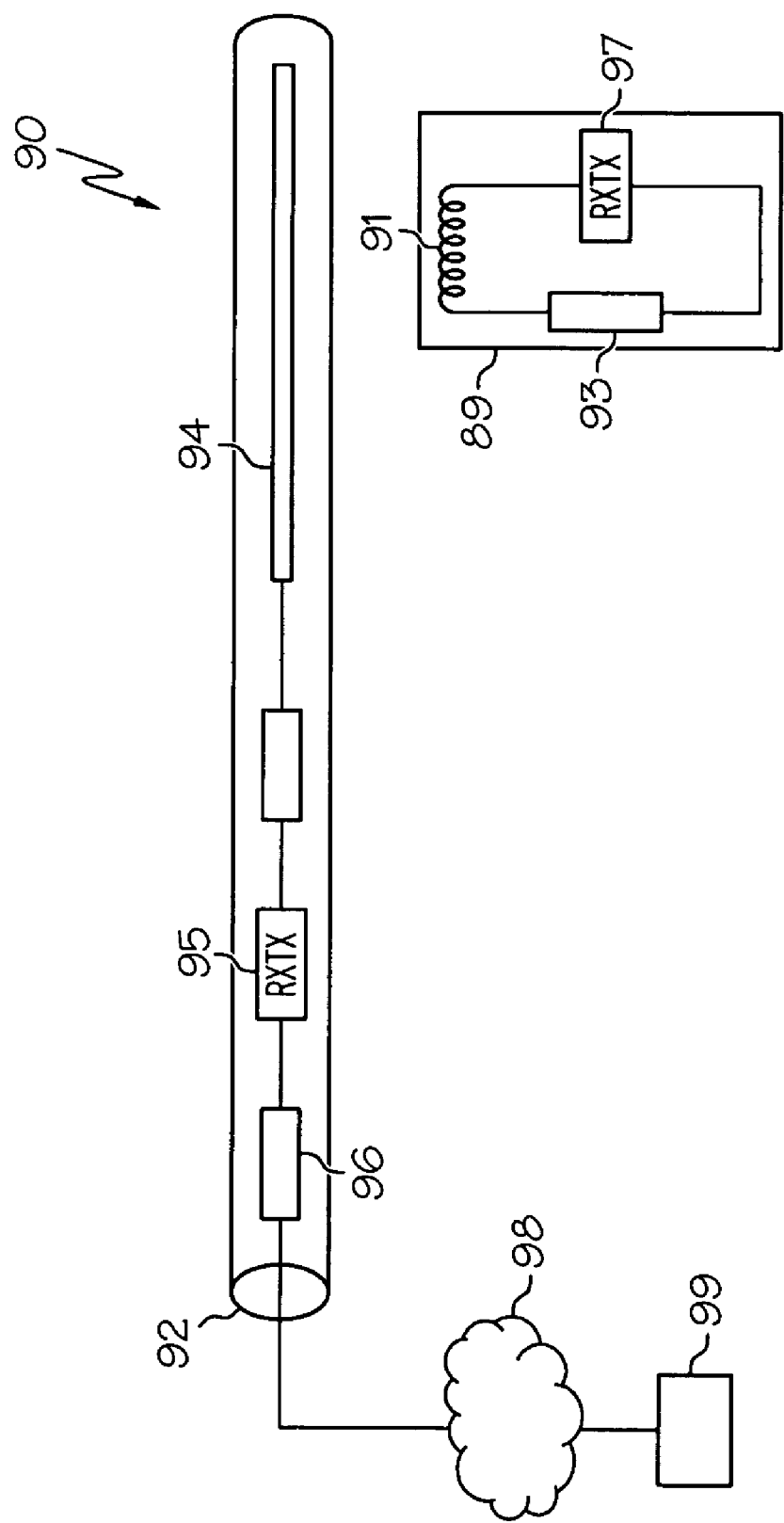
FIG. 4 shows a further embodiment of an inductive charging rack.

FIG. 4 shows a further embodiment of an inductive charging rack. In this configuration, charging rack 90 consists of a pole 92. Pole 92 could be affixed to a wall or it could be part of a movable rack. Inductive primary 94 is located within pole 92. Inductive secondary 72 if brought within proximity to pole 92, will couple with inductive primary 94, which will thereby charge the rechargeable power source 36. Pole 92 has RXTX 95. Pole 92 also has optional network connection 96.

Network connection 96 allows pole 92 to be coupled with network 98. Network 98 is connected to remote device 99. Network connection 96 could be a router or hub enabling communication to be seamlessly routed to devices throughout network 98 as well as devices coupled to pole 92.

Figure 5:
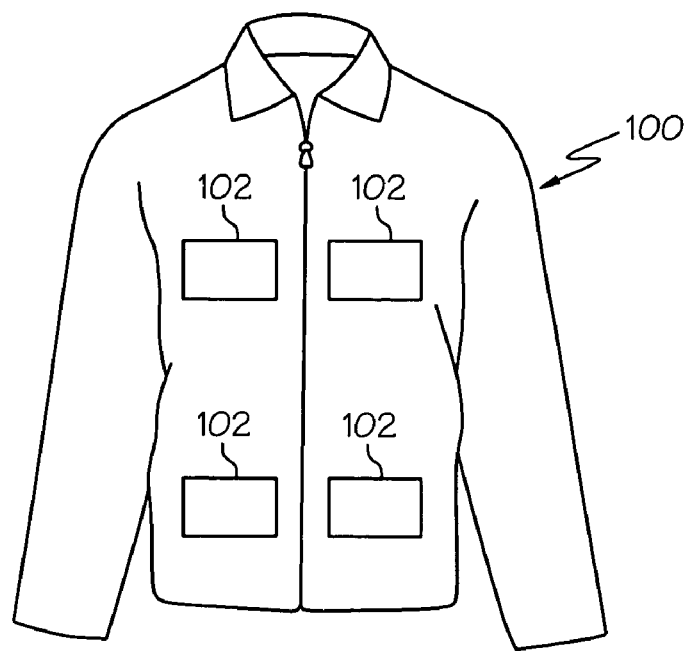
FIG. 5 shows a garment.

FIG. 5 shows garment 100. Garment 100 is provided with a plurality of pockets 102. Various electronic implements could be placed within the pockets. When garment 100 is placed in proximity to pole 92, electronic implements provided with inductive secondaries and rechargeable power sources will have their power replenished. If electronic implements also have an RXTX, then a communication link can be established between the electronic implements and RXTX 95.

Figure 6:
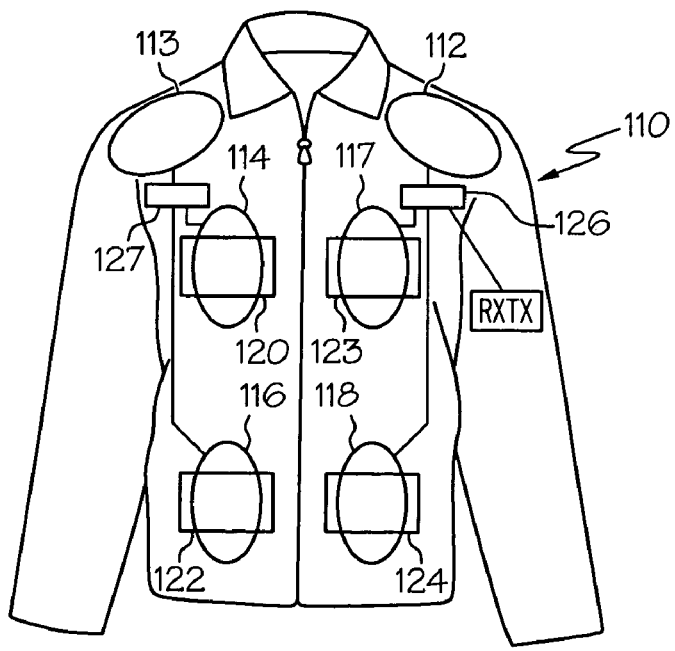
FIG. 6 shows an enhanced garment.

FIG. 6 shows enhanced garment 110. Enhanced garment 110 includes inductive secondaries 112, 113. Enhanced garment inductive secondaries 112, 113 are designed to interact directly with inductive primary 94. Enhanced garment 110 also includes a plurality of garment inductive primaries 114, 116, 117, 118. Garment inductive primary 114, 116, 117, 118 are arranged to be close to be close to pockets 120, 122, 123,124.

When garment inductive secondary 112 is energized by inductive primary 94, garment controller 126 provisions electric power to inductive primaries 114, 116, 117, 118. Garment controller 126 could also supply communication capabilities between RXTX 94 and RXTXs within the electronic implements. Devices placed within pockets of enhanced garment 110 could be connected to the network. Information could be delivered to and retrieved from the various electronic implements by computers connected to the network.

For example, if the electronic implements were portable media player devices, such as an MP3 player, MP3 files could be downloaded to or retrieved from the MP3 player. Thus, the device could be recharged while information contained within the device could be manipulated by placing the device within proximity to pole 92.

According to one embodiment, an electronic implement, such as a portable MP3 player equipped with Bluetooth or other wireless communications interfaces and a secondary adapted to provide power to the implement, is placed in one of pocket 120, 122, 123, 124 of enhanced garment 110. Enhanced garment 110 is then placed in proximity with inductive primary 94. Inductive primary 94 provides electricity to at least one of secondary 112, 113, which, in turn, provides electricity to at least one of primary 114, 116, 117, 118. The at least one of primary 114, 116, 117, 118 inductively powers the electronic implement within one of pocket 120, 122, 123, 124.

Figure 7:
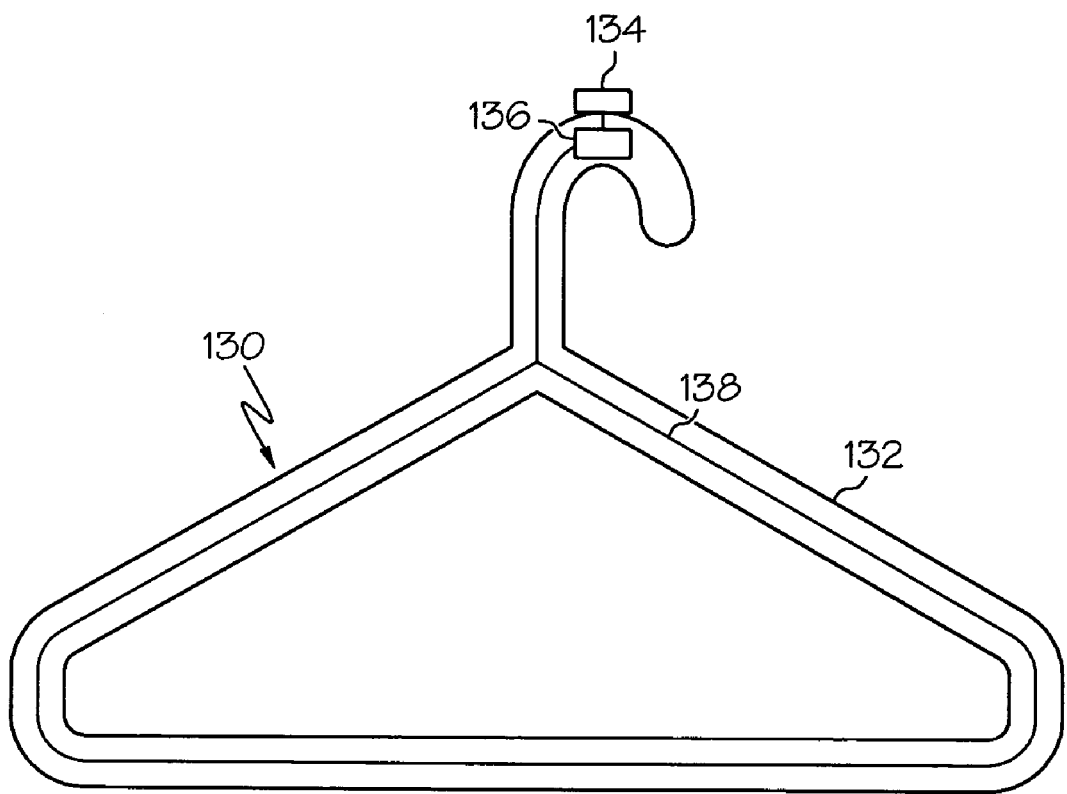
FIG. 7 shows an enhanced hanger.

FIG. 7 shows enhanced hanger 130. Enhanced hanger 130 comprises a clothes holder portion 132 and hanger controller 134. Hanger inductive secondary 136 is contained within holder portion 132.

Clothing is placed upon enhanced hanger 130. When enhanced hanger 130 is placed on pole 92, hanger inductive secondary 136 is thereby energized. Hanger controller 134 regulates the energization of hanger inductive secondary 136. Hanger inductive primary 138 is contained within holder portion 132.

If enhanced garment 110 is placed upon enhanced hanger 130 and enhanced hanger 130 is placed on pole 92, then hanger inductive secondary 136 is energized. Hanger controller 134 provisions power from hanger inductive secondary 136 to hanger inductive primary 138.

Due to the position of hanger inductive primary 138, enhanced garment 110 can have a garment inductive secondary positioned in a particular location so as to enhance the coupling between garment inductive secondary and hanger inductive primary 138.

Figure 8:
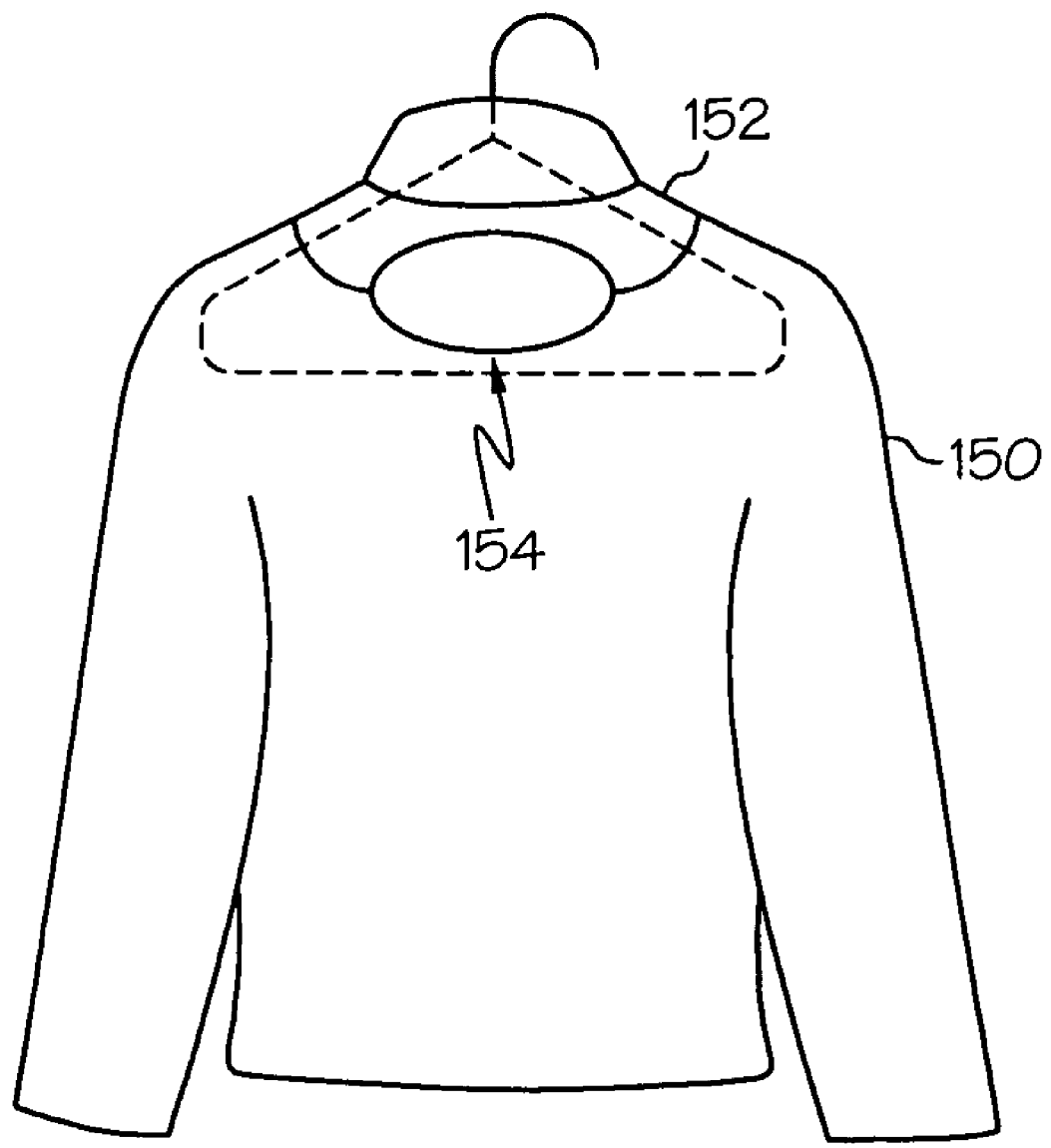
FIG. 8 shows an enhanced garment with an inductive secondary.

FIG. 8 shows enhanced garment 150 in place on enhanced hanger 130. Enhanced garment has inductive primary 154 located so as to easily interoperate with enhanced hanger 130.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A charging rack for selectively securing and recharging a plurality of rechargeable implements, each of the plurality of rechargeable implements including an inductive secondary for receiving power comprising:
a charging rack back support structure;
a coreless inductive primary attached to the charging rack back support structure, wherein the coreless inductive primary is capable of being inductively coupled to the inductive secondary of the at least one of the rechargeable implements and wherein the coreless inductive primary provides power to the inductive secondary of the at least one of the plurality of rechargeable implements while the at least one of the rechargeable implements is secured to the charging rack;
a controller for managing the power provided by the coreless inductive primary to recharge the at least one of the plurality of rechargeable implements secured to the charging rack; and
a plurality of hangers for selectively mechanically securing the plurality of rechargeable implements to the charging rack back support structure such that the inductive secondary of each of the plurality of rechargeable implements is in sufficient proximity to the coreless inductive primary to transfer power.

2. The rack of claim 1 where the controller comprises:
a ballast.

3. The rack of claim 1 where the controller further comprises a transceiver.

4. The rack of claim 3 where a portion of the coreless inductive primary extends into the hanger.

5. The rack of claim 4 where the inductive primary is embedded within the charging rack.

6. The rack of claim 4 where the coreless inductive primary is located on the charging rack back support structure.

7. An inductive charging rack for charging a plurality of implements, each of the plurality of implements having an inductive secondary and a rechargeable battery, comprising:
a charging rack back;
a coreless inductive primary attached to the charging rack back for providing power to the inductive secondary of each of the plurality of implements;
a control in communication with the coreless inductive primary for managing energizing of the coreless inductive primary; and
a hanger for holding at least one of the plurality of implements during charging.

8. The inductive charging rack of claim 7 wherein the control includes a ballast for energizing the inductive primary.

9. The inductive charging rack of claim 7 wherein the control further includes:
a controller for managing energizing of the inductive primary by the ballast.

10. The inductive charging rack of claim 8 further comprising:
a transceiver for providing data communication to the implement.

11. The inductive charging rack of claim 10 further comprising wherein a portion of the inductive primary extends within the hanger.

12. The inductive charging rack of claim 11 wherein the hanger comprises a strap and the inductive primary extends within the strap.

13. The inductive charging rack of claim 11 wherein the hanger comprises a post.

14. An inductive charging rack for holding and recharging an electronic implement including an inductive secondary comprising:
a pole for holding the electronic implement; and
a coreless inductive primary extending within the pole, wherein the coreless inductive primary is capable of inductively coupling and recharging the inductive secondary of the electronic implement.

15. The inductive charging rack of claim 14 further comprising:
a ballast for energizing the coreless inductive primary.

16. The inductive charging rack of claim 15 further comprising a controller for managing energizing of the inductive primary.

17. The inductive charging rack of claim 16 further comprising a transceiver for providing data communication with the electronic implement.

18. The inductive charging rack of claim 17 further comprising a network interface for enabling communication between the inductive charging rack and a network.

19. The inductive charging rack of claim 18 wherein the transceiver allows communication between the electronic implement and the network.

20. An enhanced hanger for receiving power from a first inductive primary comprising:
a hanger portion for holding clothing;
an inductive secondary for receiving power from the first inductive primary; and
a second inductive primary energized by the inductive secondary.

21. The enhanced hanger of claim 20 further comprising a controller for managing energizing of the second inductive primary by the inductive secondary.

22. The enhanced hanger of claim 21 wherein the controller manages energizing of the inductive secondary by the first inductive primary.

\* \* \* \* \*